United States Patent
Karakkad Kesavan Namboodiri et al.

(10) Patent No.: US 11,881,923 B2
(45) Date of Patent: Jan. 23, 2024

(54) TECHNIQUES FOR HANDLING A RADIO LINK FAILURE IN A WIRELESS COMMUNICATION SYSTEM

(71) Applicant: QUALCOMM Incorporated, San Diego, CA (US)

(72) Inventors: Vishnu Namboodiri Karakkad Kesavan Namboodiri, Hyderabad (IN); Arnab Pal, Hyderabad (IN); Mahendran Kamatchi, Hyderabad (IN); Shabnam Parvin Mondal, Hyderabad (IN); Yongle Wu, San Diego, CA (US); Yong Li, San Diego, CA (US); Ruhua He, San Diego, CA (US); Priyanka Yenigalla, Erie, CO (US)

(73) Assignee: QUALCOMM Incorporated, San Diego, CA (US)

(*) Notice: Subject to any disclaimer, the term of this patent is extended or adjusted under 35 U.S.C. 154(b) by 69 days.

(21) Appl. No.: 17/778,735

(22) PCT Filed: Dec. 22, 2020

(86) PCT No.: PCT/US2020/066678
§ 371 (c)(1),
(2) Date: May 20, 2022

(87) PCT Pub. No.: WO2021/133830
PCT Pub. Date: Jul. 1, 2021

(65) Prior Publication Data
US 2022/0399931 A1 Dec. 15, 2022

(30) Foreign Application Priority Data
Dec. 24, 2019 (IN) .............................. 201941053677

(51) Int. Cl.
*H04B 7/10* (2017.01)
*H04B 7/08* (2006.01)
(Continued)

(52) U.S. Cl.
CPC ........... *H04B 7/088* (2013.01); *H04B 7/0695* (2013.01); *H04W 56/001* (2013.01); *H04L 1/0061* (2013.01)

(58) Field of Classification Search
CPC ... H04B 7/088; H04B 7/0695; H04W 56/001; H04L 1/0061
(Continued)

(56) References Cited

U.S. PATENT DOCUMENTS

2018/0288757 A1 10/2018 Sun et al.
2019/0116605 A1 4/2019 Luo et al.
2019/0297648 A1* 9/2019 Nagaraja ................ H04B 7/063

FOREIGN PATENT DOCUMENTS

WO 2018201450 A1 11/2018

OTHER PUBLICATIONS

International Search Report and Written Opinion—PCT/US2020/066678—ISA/EPO—dated Mar. 24, 2021.

* cited by examiner

*Primary Examiner* — Zewdu A Kassa
(74) *Attorney, Agent, or Firm* — Arent Fox, LLP

(57) ABSTRACT

In an aspect, the present disclosure includes a method, apparatus, and computer readable medium for wireless communications at a user equipment (UE) for measuring one or more synchronization signal block (SSB) beams from a network entity; selecting a highest rated SSB beam from the one or more SSB beams based on one or more selection factors; transmitting, to the network entity, a beam report including an identification of the highest rated SSB beam;

(Continued)

initiating a timer in response to transmitting the beam report; determining whether a media access control (MAC) control element (CE) is received from the network entity before expiration of the timer; and performing beam switching from a current SSB beam to the highest rated SSB beam based on a determination that the MAC CE is not received from the network entity before expiration of the timer.

30 Claims, 9 Drawing Sheets

(51) Int. Cl.
*H04B 7/06* (2006.01)
*H04W 56/00* (2009.01)
*H04L 1/00* (2006.01)

(58) Field of Classification Search
USPC ................................ 375/347, 219, 295, 316
See application file for complete search history.

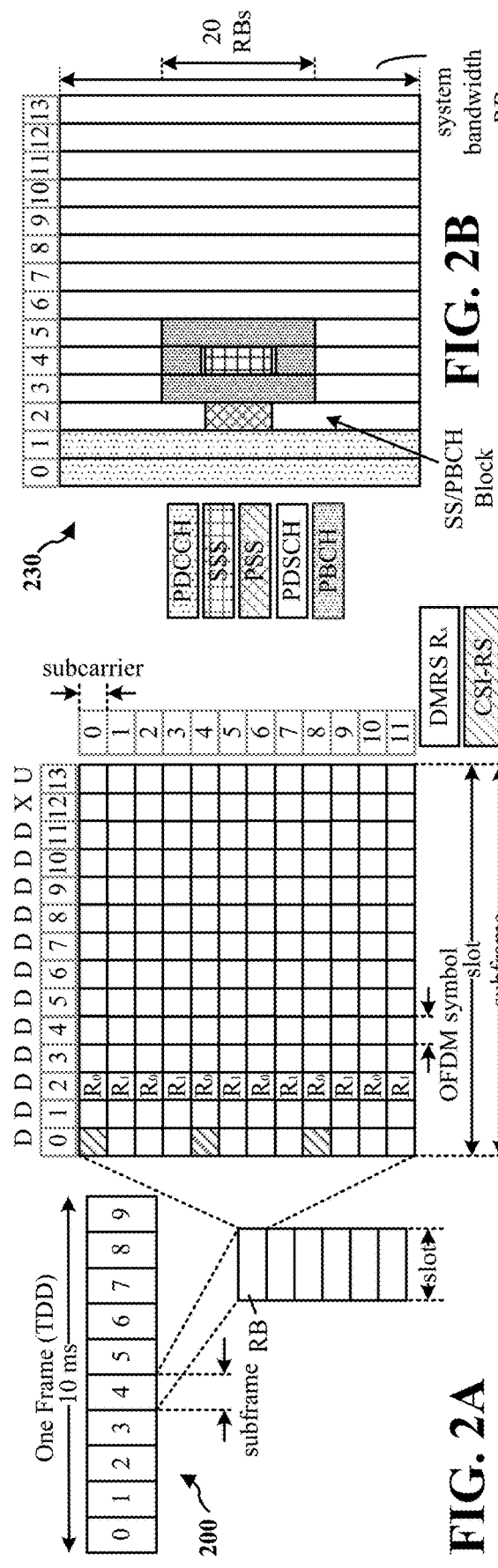
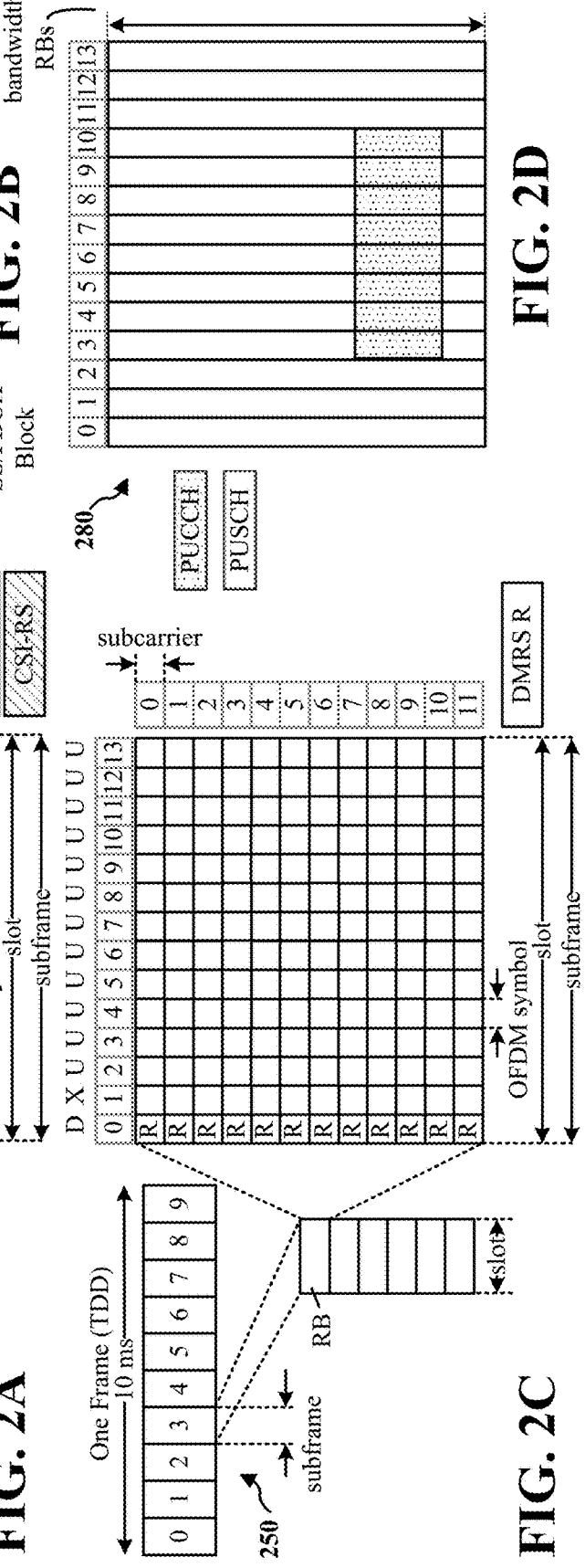
FIG. 2A
FIG. 2B
FIG. 2C
FIG. 2D

TECHNIQUES FOR HANDLING A RADIO LINK FAILURE IN A WIRELESS COMMUNICATION SYSTEM

CROSS-REFERENCE TO RELATED APPLICATIONS

The present application is a 35 U.S.C. 371 National Phase Application of PCT Application No. PCT/US2020/066678 filed Dec. 22, 2020, entitled "TECHNIQUES FOR HANDLING A RADIO LINK FAILURE IN A WIRELESS COMMUNICATION SYSTEM," which claims benefit of Indian Application No. 201941053677, entitled "TECHNIQUES FOR HANDLING A RADIO LINK FAILURE IN A WIRELESS COMMUNICATION SYSTEM" filed Dec. 24, 2019, and is assigned to the assignee hereof. The disclosures of these prior applications are hereby incorporated by reference herein in their entirety.

BACKGROUND

The present disclosure relates generally to communication systems, and more particularly, to improved handling of radio link failures (RLFs) in fifth generation new radio (5G NR).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication, including measuring, by the user equipment (UE), one or more synchronization signal block (SSB) beams from a network entity; selecting, by the UE, a highest rated SSB beam from the one or more SSB beams based on one or more selection factors; transmitting, by the UE to the network entity, a beam report including an identification of the highest rated SSB beam; initiating, by the UE, a timer in response to transmitting the beam report; determining, by the UE, whether a media access control (MAC) control element (CE) is received from the network entity before expiration of the timer; performing, by the UE, beam switching from a current SSB beam to the highest rated SSB beam based on a determination that the MAC CE is not received from the network entity before expiration of the timer.

In a further example, an apparatus for wireless communication is provided that includes a transceiver, a memory configured to store instructions, and one or more processors communicatively coupled with the transceiver and the memory. The one or more processors are configured to execute the instructions to measure one or more SSB beams from a network entity; select a highest rated SSB beam from the one or more SSB beams based on one or more selection factors; transmit a beam report including an identification of the highest rated SSB beam to the network entity; initiate a timer in response to transmitting the beam report; determine whether a MAC CE is received from the network entity before expiration of the timer; and perform beam switching from a current SSB beam to the highest rated SSB beam based on a determination that the MAC CE is not received from the network entity before expiration of the timer.

In another aspect, an apparatus for wireless communication is provided that includes means for measuring one or more SSB beams from a network entity; means for selecting a highest rated SSB beam from the one or more SSB beams based on one or more selection factors; means for transmit a beam report including an identification of the highest rated SSB beam to the network entity; means for initiating a timer in response to transmitting the beam report; means for determining whether a MAC CE is received from the network entity before expiration of the timer; and means for performing beam switching from a current SSB beam to the highest rated SSB beam based on a determination that the MAC CE is not received from the network entity before expiration of the timer.

In yet another aspect, a non-transitory computer-readable medium is provided including code executable by one or more processors to measure one or more SSB beams from a network entity; select a highest rated SSB beam from the one or more SSB beams based on one or more selection factors; transmit a beam report including an identification of the highest rated SSB beam to the network entity; initiate a timer in response to transmitting the beam report; determine whether a MAC CE is received from the network entity before expiration of the timer; and perform beam switching from a current SSB beam to the highest rated SSB beam based on a determination that the MAC CE is not received from the network entity before expiration of the timer.

In another example implementation, a method of wireless communication includes measuring, by the UE, one or more SSB beams from a network entity; selecting, by the UE, a highest rated SSB beam from the one or more SSB beams based on one or more selection factors; initiating, by the UE, a timer in response to the selecting of the highest rated SSB beam; determining, by the UE, whether a MAC CE is received from the network entity before expiration of the timer; transmitting, by the UE to the network entity, a request for a radio resource control (RRC) reconfiguration message including the identification of the highest rated SSB beam based on a determination that the MAC CE is not received from the network entity before expiration of the timer; receiving, by the UE from the network entity, the RRC reconfiguration message in response to transmitting the request; and performing, by the UE, beam switching from a current SSB beam to the highest rated SSB beam based on the RRC reconfiguration message.

In a further example, an apparatus for wireless communication is provided that includes a transceiver, a memory configured to store instructions, and one or more processors communicatively coupled with the transceiver and the memory. The one or more processors are configured to execute the instructions to measure one or more SSB beams from a network entity; select a highest rated SSB beam from the one or more SSB beams based on one or more selection factors; initiate a timer in response to the selecting of the highest rated SSB beam; determine whether a MAC CE is received from the network entity before expiration of the timer; transmit, to the network entity, a request for a RRC reconfiguration message including the identification of the highest rated SSB beam based on a determination that the MAC CE is not received from the network entity before expiration of the timer; receive, from the network entity, the RRC reconfiguration message in response to transmitting the request; and perform beam switching from a current SSB beam to the highest rated SSB beam based on the RRC reconfiguration message.

In another aspect, an apparatus for wireless communication is provided that includes means for measuring one or more SSB beams from a network entity; means for selecting a highest rated SSB beam from the one or more SSB beams based on one or more selection factors; means for initiating a timer in response to the selecting of the highest rated SSB beam; means for determining whether a MAC CE is received from the network entity before expiration of the timer; means for transmitting, by the UE to the network entity, a request for a RRC reconfiguration message including the identification of the highest rated SSB beam based on a determination that the MAC CE is not received from the network entity before expiration of the timer; means for receiving, by the UE from the network entity, the RRC reconfiguration message in response to transmitting the request; and means for performing, by the UE, beam switching from a current SSB beam to the highest rated SSB beam based on the RRC reconfiguration message.

In yet another aspect, a non-transitory computer-readable medium is provided including code executable by one or more processors to measure one or more SSB beams from a network entity; select a highest rated SSB beam from the one or more SSB beams based on one or more selection factors; initiate a timer in response to the selecting of the highest rated SSB beam; determine whether a MAC CE is received from the network entity before expiration of the timer; transmit, to the network entity, a request for a RRC reconfiguration message including the identification of the highest rated SSB beam based on a determination that the MAC CE is not received from the network entity before expiration of the timer; receive, from the network entity, the RRC reconfiguration message in response to transmitting the request; and perform beam switching from a current SSB beam to the highest rated SSB beam based on the RRC reconfiguration message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
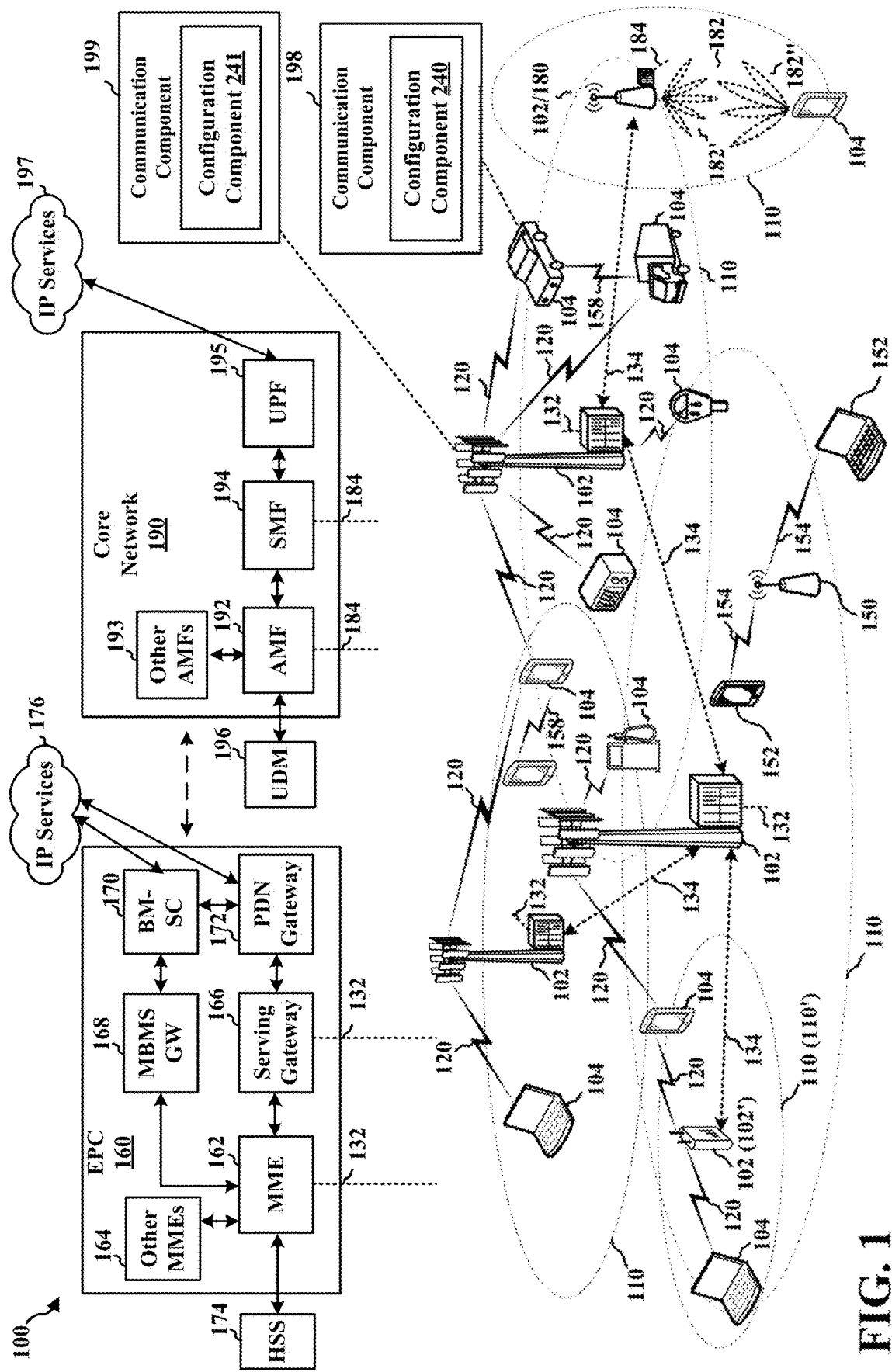
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 configured for improved handling of radio link failure (RLF) in fifth generation new radio (5G NR). The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate a communication component 198 and/or a configuration component 240 to measure one or more synchronization signal block (SSB) beams from a network entity; select a highest rated SSB beam from the one or more SSB beams based on one or more selection factors; transmit, to the network entity, a beam report including an identification of the highest rated SSB beam; initiate a timer in response to transmitting the beam report; determine whether a media access control (MAC) control element (CE) is received from the network entity before expiration of the timer; perform beam switching from a current SSB beam to the highest rated SSB beam based on a determination that the MAC CE is not received from the network entity before expiration of the timer.

In further aspects, the UE 104 may be configured to operate a communication component 198 and/or a configuration component 240 to measure one or more SSB beams from a network entity; select a highest rated SSB beam from the one or more SSB beams based on one or more selection factors; initiate a timer in response to the selecting of the highest rated SSB beam; determine whether a MAC CE is received from the network entity before expiration of the timer; transmit, to the network entity, a request for a radio resource control (RRC) reconfiguration message including the identification of the highest rated SSB beam based on a determination that the MAC CE is not received from the network entity before expiration of the timer; receive, from the network entity, the RRC reconfiguration message in response to transmitting the request; and perform beam switching from a current SSB beam to the highest rated SSB beam based on the RRC reconfiguration message.

Correspondingly, in certain aspects, the network entity 102 (e.g., base station) and/or another UE, such as UE 104, may be configured to operate a communication component 199 and/or a configuration component 241 to communicate, e.g., engage in a handshake procedure, with UE 104. For example, communication component 199 and/or a configuration component 241 may transmit one or more SSB beams to one or more UEs 104.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5GNR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
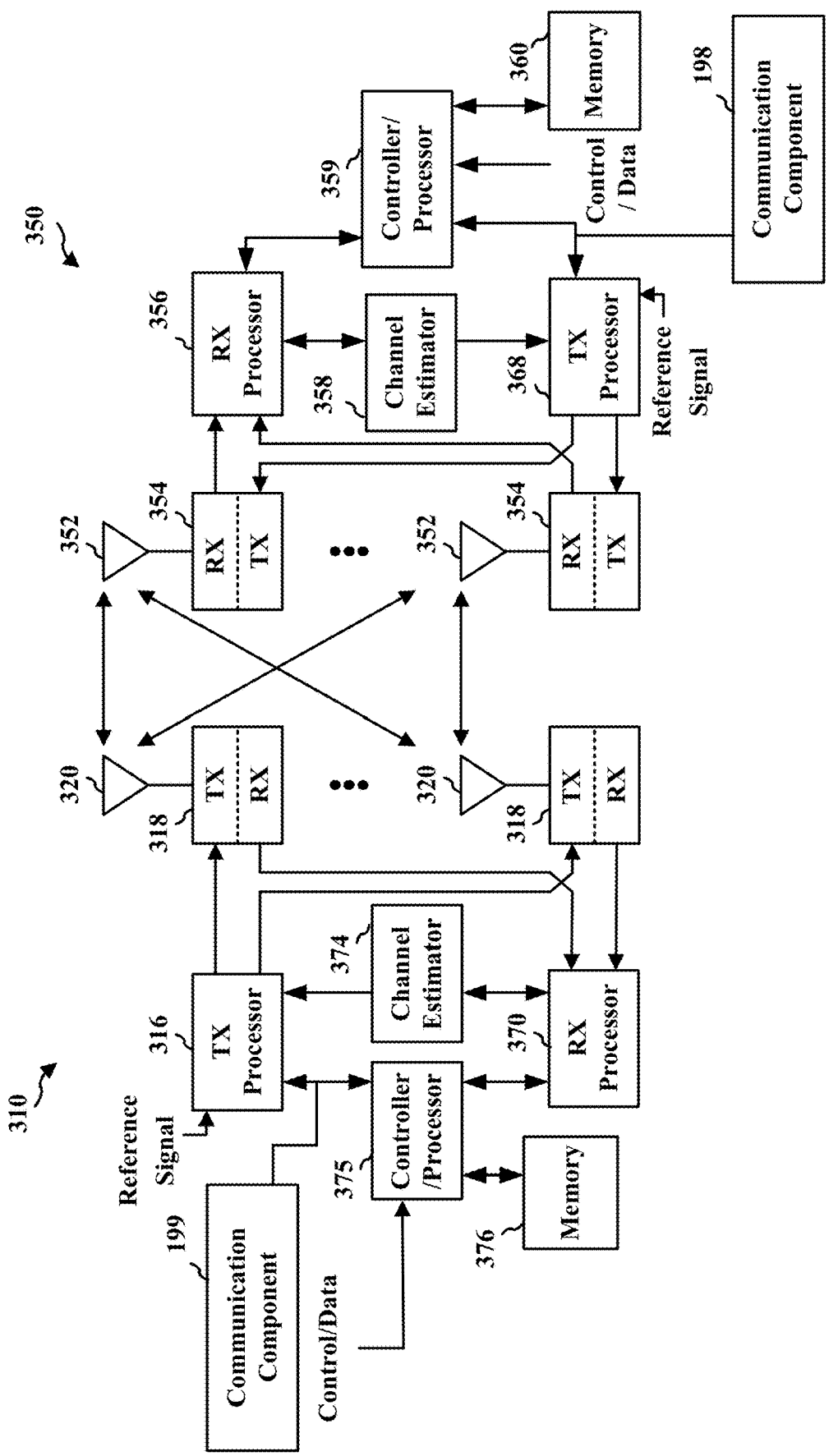
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Referring to FIGS. 4-9, the described features generally relate to improved handling of radio link failures (RLFs) in fifth generation new radio (5G NR). For example in 5G NR, larger antenna array dimensions are used to achieve adequate network coverage and connection to one or more UEs established through serving beam (e.g., serving SSB). In some instances, the network may direct the UE to have a beam switch change from a current SSB X to a new SSB Y. The UE may only request the network for a beam switch through random access channel (RACH) attempts or periodic beam reporting. The network may decide from the beam reporting and/or RACH attempt from the UE, and may transmit a radio resource control (RRC) reconfiguration or a media access control (MAC) control element (CE) down selection to have beam switches. Since in mmW higher pathloss and Doppler impact is expected, beam switches are needed to maintain a proper connection and/or improve data throughput.

In an aspect, during connection set up, the UE and network may establish a gNB serving SSB Tx to UE Rx beam pair. In some examples, when the UE has mobility, the UE may not observe the highest reference signal received power (RSRP) from the previous serving gNB SSB Tx beam. The UE may determine the best RSRP from the neighbor SSB Tx beam (e.g., the virtual serving SSB (VSSSB) of the same gNB. Accordingly, a two-way handshake mechanism between the gNB and the UE is needed to established the next best beam pair link with VSSSB and the UE Rx beam. During the handshake process, the UE may measure the SSB Tx beam with Rx beams and report them to the gNB.

In an aspect, certain networks may not support MAC CE in specific countries. However, in order to maintain a connection, a need exists to resolve this issue in order to prevent a large number of call drops and/or RLFs resulting in poor user experiences.

The present disclosure relates generally to current issues of handling RLFs in 5G NR. For example, in an aspect, the present disclosure includes a method, apparatus, and non-statutory computer readable medium for wireless communications for measuring, by the UE, one or more SSB beams from a network entity; selecting, by the UE, a highest rated SSB beam from the one or more SSB beams based on one or more selection factors; transmitting, by the UE to the network entity, a beam report including an identification of the highest rated SSB beam; initiating, by the UE, a timer in response to transmitting the beam report; determining, by the UE, whether a MAC CE is received from the network entity before expiration of the timer; performing, by the UE, beam switching from a current SSB beam to the highest rated SSB beam based on a determination that the MAC CE is not received from the network entity before expiration of the timer.

In another example the present disclosure includes a method, apparatus, and non-statutory computer readable medium for wireless communications for measuring, by the UE, one or more SSB beams from a network entity; selecting, by the UE, a highest rated SSB beam from the one or more SSB beams based on one or more selection factors; initiating, by the UE, a timer in response to the selecting of the highest rated SSB beam; determining, by the UE, whether a MAC CE is received from the network entity before expiration of the timer; transmitting, by the UE to the network entity, a request for a radio resource control (RRC) reconfiguration message including the identification of the highest rated SSB beam based on a determination that the MAC CE is not received from the network entity before expiration of the timer; receiving, by the UE from the network entity, the RRC reconfiguration message in response to transmitting the request; and performing, by the UE, beam switching from a current SSB beam to the highest rated SSB beam based on the RRC reconfiguration message.

Figure 4:
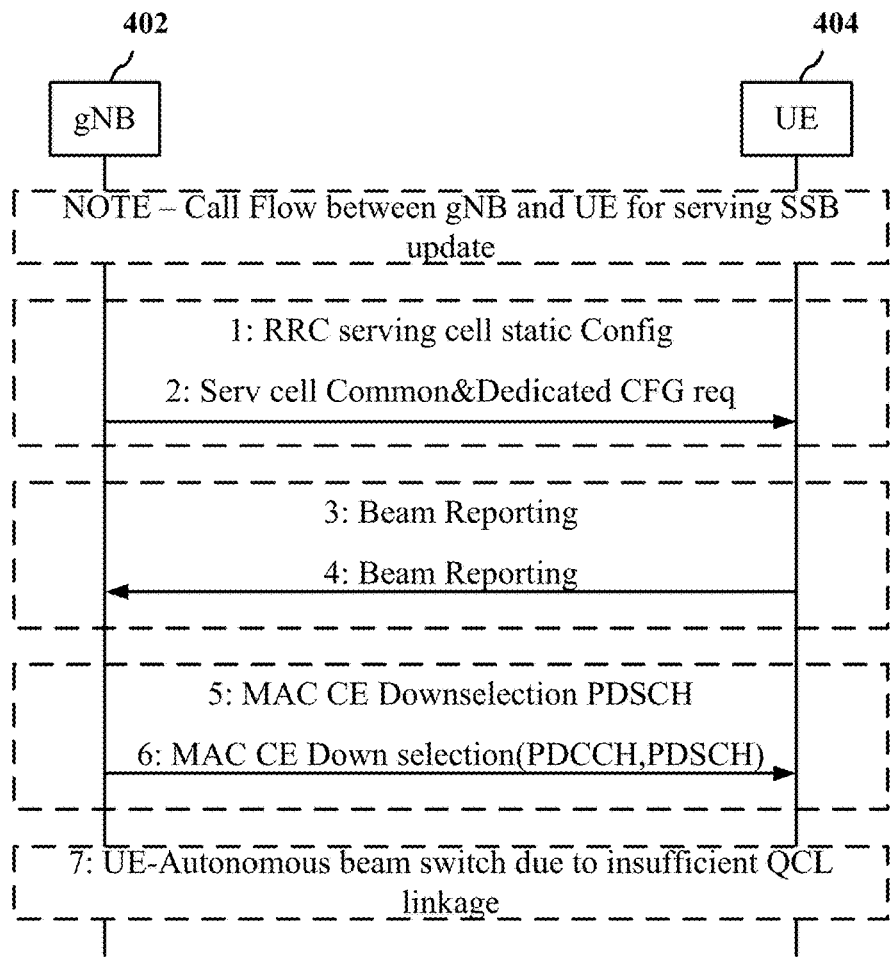
FIG. 4 is a diagram illustrating a message flow between a UE and a network entity corresponding to a media access control (MAC) control element (CE) down selection (DS) procedure.

FIG. 4 is a diagram 400 illustrating a message flow between a UE and a network entity corresponding to a media access control (MAC) control element (CE) down selection (DS) procedure. For example, the diagram 400 illustrates the message flow of the gNB 402 determining that the UE 404 is considering beam switching. In step 1, the gNB 402 may perform RRC serving cell static configuration. In step 2, the gNB 402 may transmit a serving cell common and dedicated CFG request for an RRC serving cell static configuration. In step 3, the gNB 402 may perform beam reporting, and at step 4, UE 404 may transmit the beam report to gNB 402. In step 5, the down selection of the PDSCH occurs between the gNB 402 and the UE 404. For example, in step 6, the gNB 402 may transmit the MAC CE down selection message associated with the PDCCH and PDSCH to the UE 404. In step 7, the UE may perform autonomous beam switching due to insufficient quasi-co location (QCL) linkage with the gNB 402.

Figure 5:
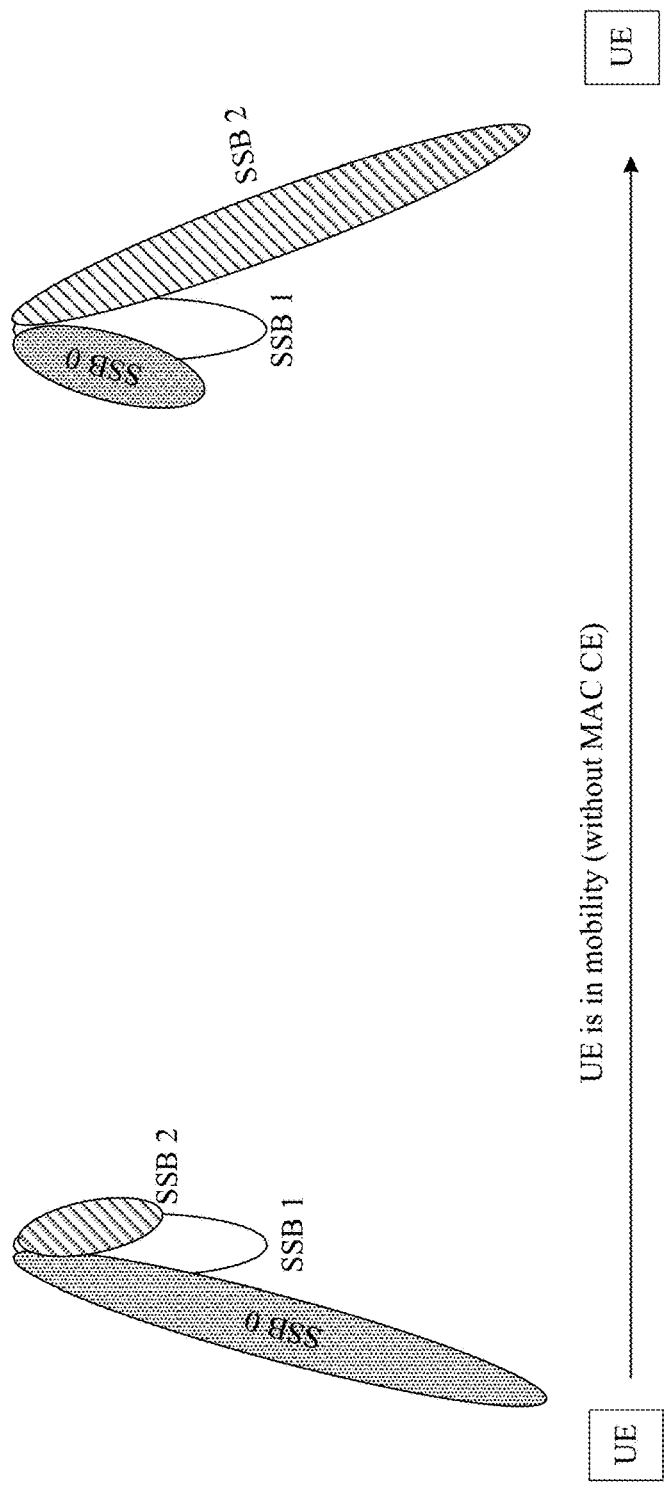
FIG. 5 is a diagram illustrating a radio link failure (RLF) at a UE due to absence of a MAC CE.

FIG. 5 is a diagram 500 illustrating a radio link failure (RLF) at a UE due to absence of a MAC CE. For example, a gNB may transmit a MAC CE beam switch command to a UE. However, if the network does not support serving gNB Tx beam (e.g., SSB beam) switch through the MAC CE or even after waiting for a MAC CE from the network when a beam failure detection occurs or a beam failure recovery has started, then during initial deployment a number issues may occur. In some instances, the UE may be fixed at the current serving SSB beam even if the UE changes locations and the UE does not measure maximum L1-RSRP in the VSSSSB Tx beam. In some instances, the throughput may be degraded. In some instances, the beam switching without MAC CE present may cause a RLF failure and camping on the VSSSB. In an example, diagram 500 illustrates the UE being served by serving SSB 0. As the UE moves without receiving a MAC CE, the serving SSB remains SSB 0. However, as the UE moves far enough, the UE begins to observe weak power from SSB 0 which may result in a RLF and poor throughput.

Figure 6:
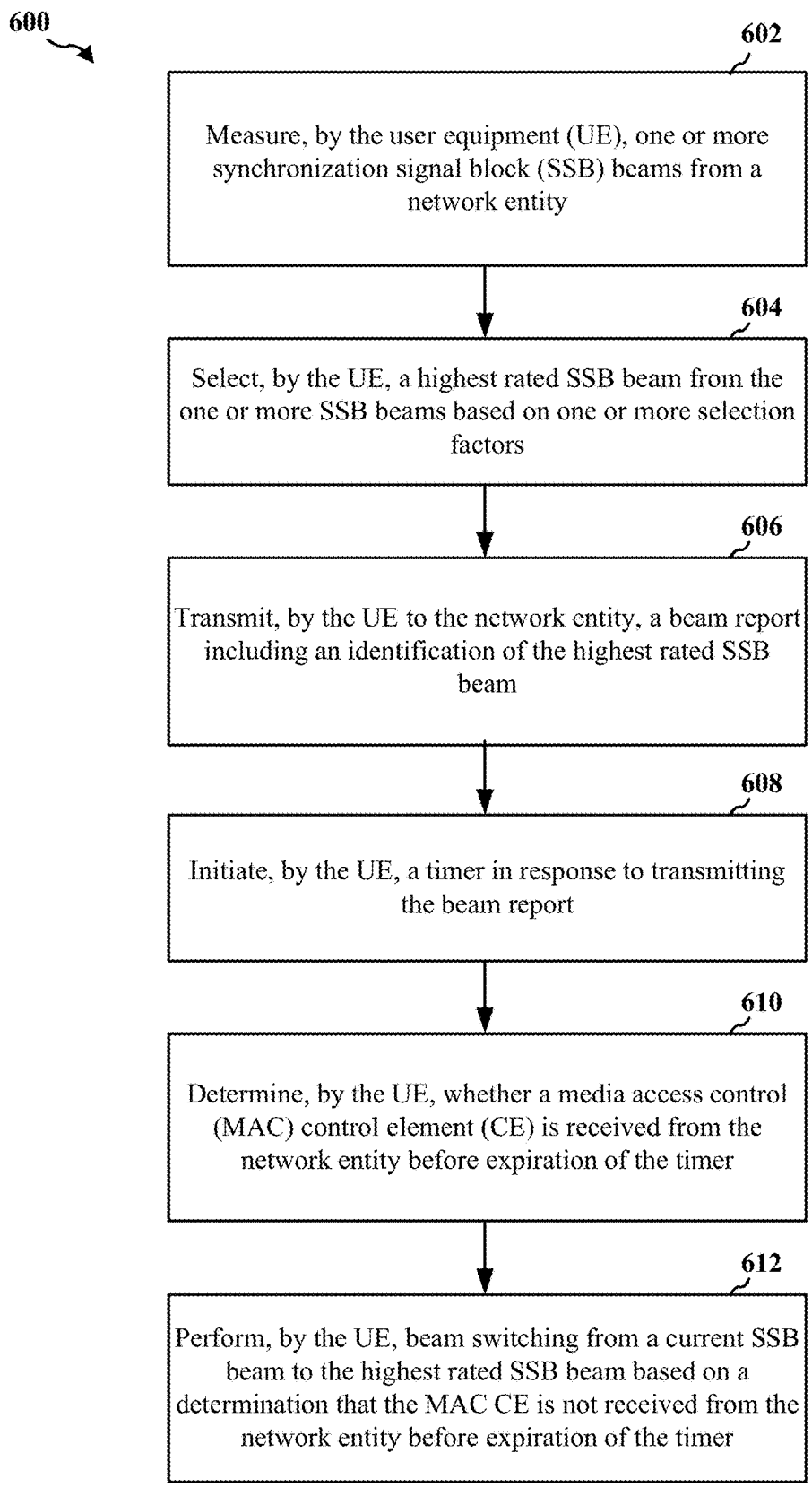
FIG. 6 is a flowchart of a method of wireless communication, and more specifically beam switching by a UE based on a MAC CE wait timer.

FIG. 6 is a flowchart 600 of a method of wireless communication, and more specifically beam switching by a UE based on a MAC CE wait timer. The method may be performed by a UE (e.g., the UE 104; the apparatus 350; the controller/processor 359, which may include the memory 360, processor(s) 512, which may include the memory 516, modem 540 and which may be the entire UE 104 or a component of the UE 104, such as the TX processor 368, the RX processor 356, and/or the transceiver 502) in combination with the communication component 198/configuration component 240.

At 602, method 600 includes measuring, by the UE, one or more SSB beams from a network entity. In an aspect, the UE 104 and/or the communication component 198/configuration component 240 may be configured to measure one or more SSB beams from a network entity. As such, the UE 104 and/or the communication component 198/configuration component 240, e.g., in conjunction with controller/processor 359, which may include the memory 360, processor(s) 512, which may include the memory 516, modem 540, TX processor 368, and transceiver 502 may define a means for measuring, by the UE, one or more SSB beams from a network entity.

In an example of method 600, the UE 104 and/or the communication component 198/configuration component 240 configured for measuring the one or more SSB beams further comprises measuring a corresponding reference signal receive power (RSRP) for each of the one or more SSB beams.

In an example of method 600, the UE 104 and/or the communication component 198/configuration component 240 configured for measuring the one or more SSB beams further comprises measuring one or more neighbor SSB transmission beams paired with one or more reception beams at a current position of the UE. For example, the one or more neighbor SSB transmission beams correspond to virtual serving SSB (VSSSB) beams.

At 604, method 600 includes selecting, by the UE, a highest rated SSB beam from the one or more SSB beams based on one or more selection factors. In an aspect, the UE 104 and/or the communication component 198/configuration component 240 may be configured to select a highest rated SSB beam from the one or more SSB beams based on one or more selection factors. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for selecting, by the UE, a highest rated SSB beam from the one or more SSB beams based on one or more selection factors.

In an example of method 600, the one or more selection factors includes a physical broadcast channel (PBCH) cyclic redundancy check (CRC) threshold.

In an example of method 600, the UE 104 and/or the communication component 198/configuration component 240 configured for selecting the highest rated SSB beam further comprises selecting the highest rated SSB beam from the one or more SSB beams with a corresponding PBCH CRC that satisfies the PBCH CRC threshold.

In an example of method 600, the UE 104 and/or the communication component 198/configuration component 240 configured for selecting the highest rated SSB beam from the one or more SSB beams further comprises ranking the corresponding RSRP for each of the one or more SSB beams, wherein the a RSRP of one of the one or more SSB beams with a highest average power corresponds to the highest rated SSB beam.

At 606, method 600 includes transmitting, by the UE to the network entity, a beam report including an identification of the highest rated SSB beam. In an aspect, the UE 104 and/or the communication component 198/configuration component 240 may be configured to transmit, to the network entity, a beam report including an identification of the highest rated SSB beam. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for transmitting, by the UE to the network entity, a beam report including an identification of the highest rated SSB beam.

At 608, method 600 includes initiating, by the UE, a timer in response to transmitting the beam report. In an aspect, the UE 104 and/or the communication component 198/configuration component 240 may be configured to initiate a timer in response to transmitting the beam report. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for initiating, by the UE, a timer in response to transmitting the beam report.

At 610, method 600 includes determining, by the UE, whether a MAC CE is received from the network entity before expiration of the timer. In an aspect, the UE 104 and/or the communication component 198/configuration component 240 may be configured to determine whether a MAC CE is received from the network entity before expiration of the timer. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for determining, by the UE, whether a MAC CE is received from the network entity before expiration of the timer. In an example, the MAC CE is associated with down selection.

In an example of method 600, the UE 104 and/or the communication component 198/configuration component 240 configured for determining whether the MAC CE is received from the network entity before expiration of the timer further comprises determining whether the MAC CE is received on a physical downlink shared channel (PDSCH) or physical downlink control channel (PDCCH) from the network entity before expiration of the timer.

At 612, method 600 includes performing, by the UE, beam switching from a current SSB beam to the highest rated SSB beam based on a determination that the MAC CE is not received from the network entity before expiration of the timer. In an aspect, the UE 104 and/or the communication component 198/configuration component 240 may be configured to perform beam switching from a current SSB beam to the highest rated SSB beam based on a determination that the MAC CE is not received from the network entity before expiration of the timer. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for performing, by the UE, beam switching from a current SSB beam to the highest rated SSB beam based on a determination that the MAC CE is not received from the network entity before expiration of the timer.

In an example of method 600, the UE 104 and/or the communication component 198/configuration component 240 configured for performing the beam switching from the current SSB beam to the highest rated SSB beam is further based on a determination that no beam failure detection or beam failure recovery process has initiated before expiration of a second timer.

Figure 7:
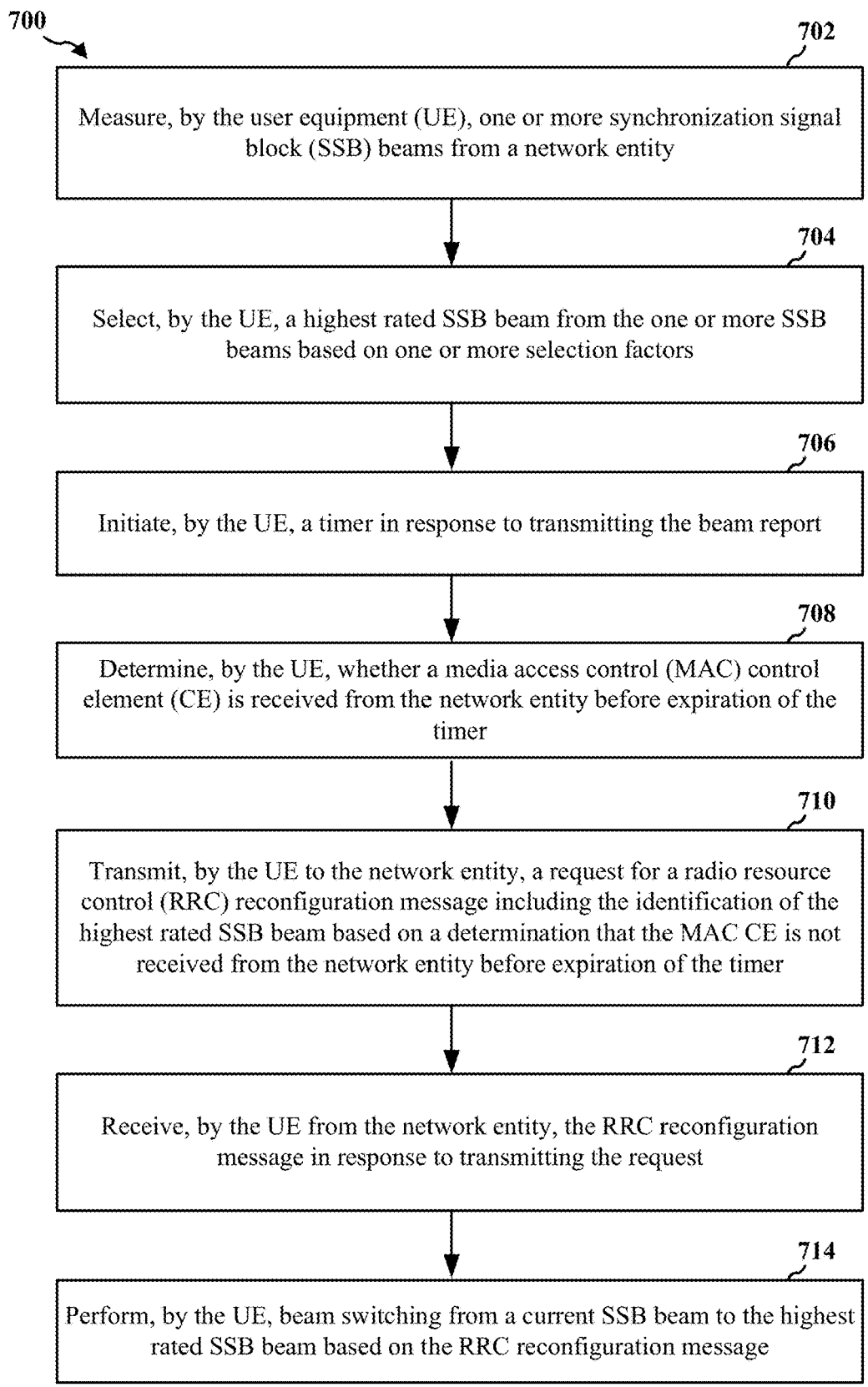
FIG. 7 is a flowchart of a method of wireless communication, and more specifically beam switching by a UE based on a radio resource control (RRC) reconfiguration message.

FIG. 7 is a flowchart 700 of a method of wireless communication, and more specifically beam switching by a UE based on a radio resource control (RRC) reconfiguration message. The method may be performed by a UE (e.g., the UE 104; the apparatus 350; the controller/processor 359, which may include the memory 360, processor(s) 512, which may include the memory 516, modem 540 and which may be the entire UE 104 or a component of the UE 104, such as the TX processor 368, the RX processor 356, and/or the transceiver 502) in combination with the communication component 198/configuration component 240.

At 702, method 700 includes measuring, by the UE, one or more synchronization signal block (SSB) beams from a network entity. In an aspect, the UE 104 and/or the communication component 198/configuration component 240 may be configured to measure one or more SSB beams from a network entity. As such, the UE 104 and/or the communication component 198/configuration component 240, e.g., in conjunction with controller/processor 359, which may include the memory 360, processor(s) 512, which may include the memory 516, modem 540, TX processor 368, and transceiver 502 may define a means for measuring, by the UE, one or more synchronization signal block (SSB) beams from a network entity.

In an example of method 700, the UE 104 and/or the communication component 198/configuration component 240 configured for measuring the one or more SSB beams further comprises measuring a corresponding RSRP for each of the one or more SSB beams.

In an example of method 700, the UE 104 and/or the communication component 198/configuration component 240 configured for measuring the one or more SSB beams further comprises measuring one or more neighbor SSB transmission beams paired with one or more reception beams at a current position of the UE. For example, the one or more neighbor SSB transmission beams correspond to VSSSB beams.

At 704, method 700 includes selecting, by the UE, a highest rated SSB beam from the one or more SSB beams based on one or more selection factors. In an aspect, the UE 104 and/or the communication component 198/configuration component 240 may be configured to select a highest rated SSB beam from the one or more SSB beams based on one or more selection factors. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for selecting, by the UE, a highest rated SSB beam from the one or more SSB beams based on one or more selection factors.

In an example of method 700, the one or more selection factors includes a PBCH CRC threshold.

In an example of method 700, the UE 104 and/or the communication component 198/configuration component 240 configured for selecting the highest rated SSB beam further comprises selecting the highest rated SSB beam from the one or more SSB beams with a corresponding PBCH CRC that satisfies the PBCH CRC threshold.

In an example of method 700, the UE 104 and/or the communication component 198/configuration component 240 configured for selecting the highest rated SSB beam from the one or more SSB beams further comprises ranking the corresponding RSRP for each of the one or more SSB beams, wherein the a RSRP of one of the one or more SSB beams with a highest average power corresponds to the highest rated SSB beam.

At 706, method 700 includes initiating, by the UE, a timer in response to the selecting of the highest rated SSB beam. In an aspect, the UE 104 and/or the communication component 198/configuration component 240 may be configured to initiate a timer in response to the selecting of the highest rated SSB beam. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for initiating, by the UE, a timer in response to the selecting of the highest rated SSB beam.

At 708, method 700 includes determining, by the UE, whether a media access control (MAC) control element (CE) is received from the network entity before expiration of the timer. In an aspect, the UE 104 and/or the communication component 198/configuration component 240 may be configured to determine whether a MAC CE is received from the network entity before expiration of the timer. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for determining, by the UE, whether a MAC CE is received from the network entity before expiration of the timer.

At 710, method 700 includes transmitting, by the UE to the network entity, a request for a RRC reconfiguration message including the identification of the highest rated SSB beam based on a determination that the MAC CE is not received from the network entity before expiration of the timer. In an aspect, the UE 104 and/or the communication component 198/configuration component 240 may be configured to transmit, to the network entity, a request for a RRC reconfiguration message including the identification of the highest rated SSB beam based on a determination that the MAC CE is not received from the network entity before expiration of the timer. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for transmitting, by the UE to the network entity, a request for a RRC reconfiguration message including the identification of the highest rated SSB beam based on a determination that the MAC CE is not received from the network entity before expiration of the timer.

In an example of method 700, the request corresponds a measurement reporting message with an additional field including information associated with the request.

In an example of method 700, the request is associated with a handshaking procedure between the UE and the network entity.

At 712, method 700 includes receiving, by the UE from the network entity, the RRC reconfiguration message in response to transmitting the request. In an aspect, the UE 104 and/or the communication component 198/configuration component 240 may be configured to receive, from the network entity, the RRC reconfiguration message in response to transmitting the request. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for receiving, by the UE from the network entity, the RRC reconfiguration message in response to transmitting the request.

At 714, method 700 includes performing, by the UE, beam switching from a current SSB beam to the highest rated SSB beam based on the RRC reconfiguration message. In an aspect, the UE 104 and/or the communication component 198/configuration component 240 may be configured to perform beam switching from a current SSB beam to the highest rated SSB beam based on the RRC reconfiguration message. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for performing, by the UE, beam switching from a current SSB beam to the highest rated SSB beam based on the RRC reconfiguration message.

Figure 8:
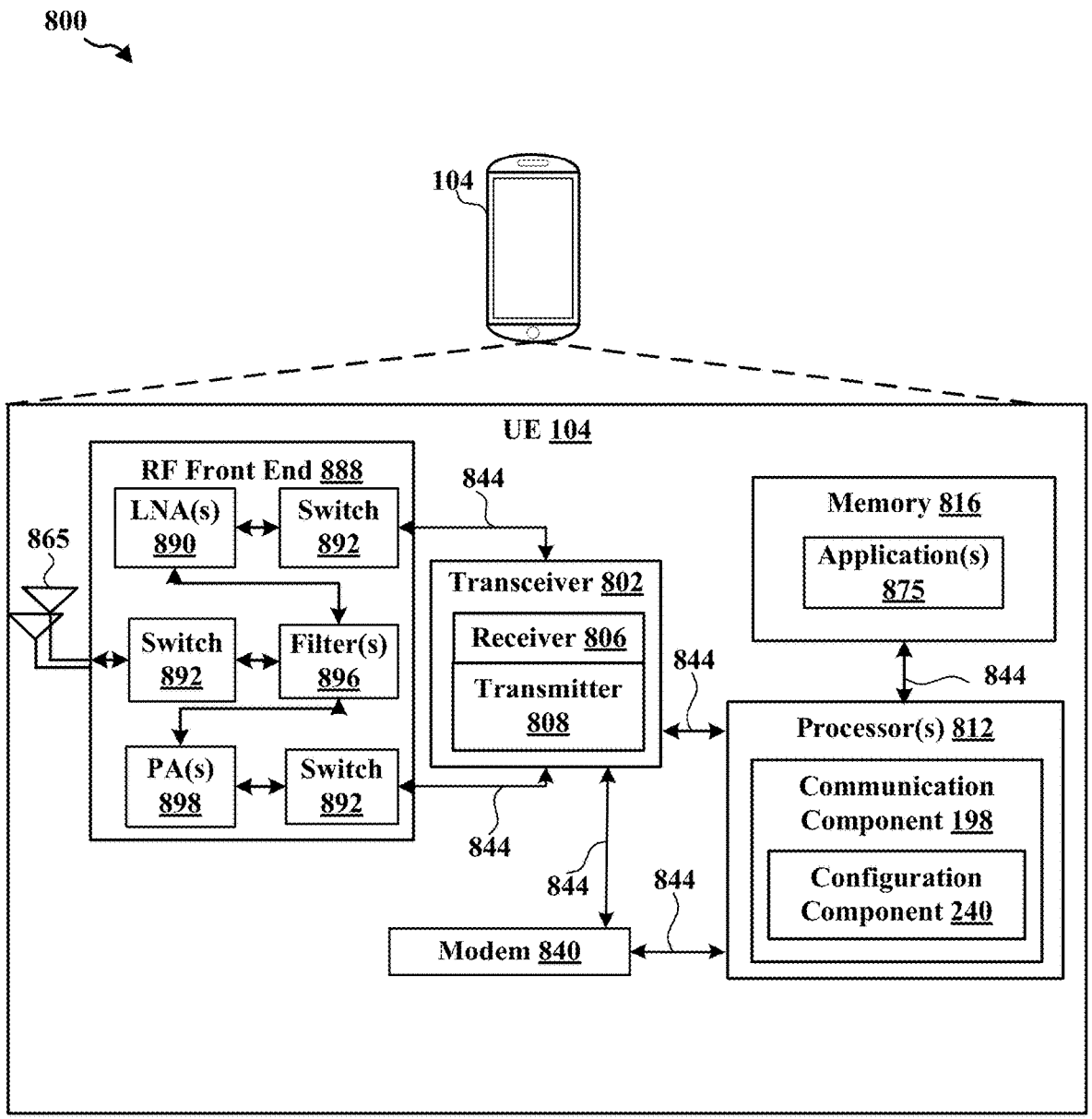
FIG. 8 is a block diagram illustrating an example of a UE, in accordance with various aspects of the present disclosure.

Referring to FIG. 8, one example of an implementation of UE 104 may include a variety of components, some of which have already been described above and are described further herein, including components such as one or more processors 812 and memory 816 and transceiver 802 in communication via one or more buses 844, which may operate in conjunction with modem 840 and/or communication component 198 for improved handling of RLFs.

In an aspect, the one or more processors 812 can include a modem 840 and/or can be part of the modem 840 that uses one or more modem processors. Thus, the various functions related to communication component 198 may be included in modem 840 and/or processors 812 and, in an aspect, can be executed by a single processor, while in other aspects, different ones of the functions may be executed by a combination of two or more different processors. For example, in an aspect, the one or more processors 812 may include any one or any combination of a modem processor, or a baseband processor, or a digital signal processor, or a transmit processor, or a receiver processor, or a transceiver processor associated with transceiver 802. In other aspects, some of the features of the one or more processors 812 and/or modem 840 associated with communication component 198 may be performed by transceiver 802.

Also, memory 816 may be configured to store data used herein and/or local versions of applications 875 or communicating component 198 and/or one or more of the subcomponents being executed by at least one processor 812. Memory 816 can include any type of computer-readable medium usable by a computer or at least one processor 812, such as random access memory (RAM), read only memory (ROM), tapes, magnetic discs, optical discs, volatile memory, non-volatile memory, and any combination thereof. In an aspect, for example, memory 816 may be a non-transitory computer-readable storage medium that stores one or more computer-executable codes defining communication component 198 and/or one or more of its subcomponents, and/or data associated therewith, when UE 104 is operating at least one processor 812 to execute communication component 198 and/or one or more of its subcomponents.

Transceiver 802 may include at least one receiver 806 and at least one transmitter 808. Receiver 806 may include hardware and/or software executable by a processor for receiving data, the code comprising instructions and being stored in a memory (e.g., computer-readable medium). Receiver 806 may be, for example, a radio frequency (RF) receiver. In an aspect, receiver 806 may receive signals transmitted by at least one base station 102. Additionally, receiver 806 may process such received signals, and also may obtain measurements of the signals, such as, but not limited to, Ec/Io, signal-to-noise ratio (SNR), reference signal received power (RSRP), received signal strength indicator (RSSI), etc. Transmitter 808 may include hardware and/or software executable by a processor for transmitting data, the code comprising instructions and being stored in a memory (e.g., computer-readable medium). A suitable example of transmitter 808 may including, but is not limited to, an RF transmitter.

Moreover, in an aspect, UE 104 may include RF front end 888, which may operate in communication with one or more antennas 865 and transceiver 802 for receiving and transmitting radio transmissions, for example, wireless communications transmitted by at least one base station 102 or wireless transmissions transmitted by UE 104. RF front end 888 may be connected to one or more antennas 865 and can include one or more low-noise amplifiers (LNAs) 890, one or more switches 892, one or more power amplifiers (PAs) 898, and one or more filters 896 for transmitting and receiving RF signals.

In an aspect, LNA 890 can amplify a received signal at a desired output level. In an aspect, each LNA 890 may have a specified minimum and maximum gain values. In an aspect, RF front end 888 may use one or more switches 892 to select a particular LNA 890 and its specified gain value based on a desired gain value for a particular application.

Further, for example, one or more PA(s) 898 may be used by RF front end 888 to amplify a signal for an RF output at a desired output power level. In an aspect, each PA 898 may have specified minimum and maximum gain values. In an aspect, RF front end 888 may use one or more switches 892 to select a particular PA 898 and its specified gain value based on a desired gain value for a particular application.

Also, for example, one or more filters 896 can be used by RF front end 888 to filter a received signal to obtain an input RF signal. Similarly, in an aspect, for example, a respective filter 896 can be used to filter an output from a respective PA 898 to produce an output signal for transmission. In an aspect, each filter 896 can be connected to a specific LNA 890 and/or PA 898. In an aspect, RF front end 888 can use one or more switches 892 to select a transmit or receive path using a specified filter 896, LNA 890, and/or PA 898, based on a configuration as specified by transceiver 802 and/or processor 812.

As such, transceiver 802 may be configured to transmit and receive wireless signals through one or more antennas 865 via RF front end 888. In an aspect, transceiver may be tuned to operate at specified frequencies such that UE 104 can communicate with, for example, one or more base stations 102 or one or more cells associated with one or more base stations 102. In an aspect, for example, modem 840 can configure transceiver 802 to operate at a specified frequency and power level based on the UE configuration of the UE 104 and the communication protocol used by modem 840.

In an aspect, modem 840 can be a multiband-multimode modem, which can process digital data and communicate with transceiver 802 such that the digital data is sent and received using transceiver 802. In an aspect, modem 840 can be multiband and be configured to support multiple frequency bands for a specific communications protocol. In an aspect, modem 840 can be multimode and be configured to support multiple operating networks and communications protocols. In an aspect, modem 840 can control one or more components of UE 104 (e.g., RF front end 888, transceiver 802) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 812 may correspond to one or more of the processors described in connection with the UE in FIG. 3. Similarly, the memory 816 may correspond to the memory described in connection with the UE in FIG. 3.

Figure 9:
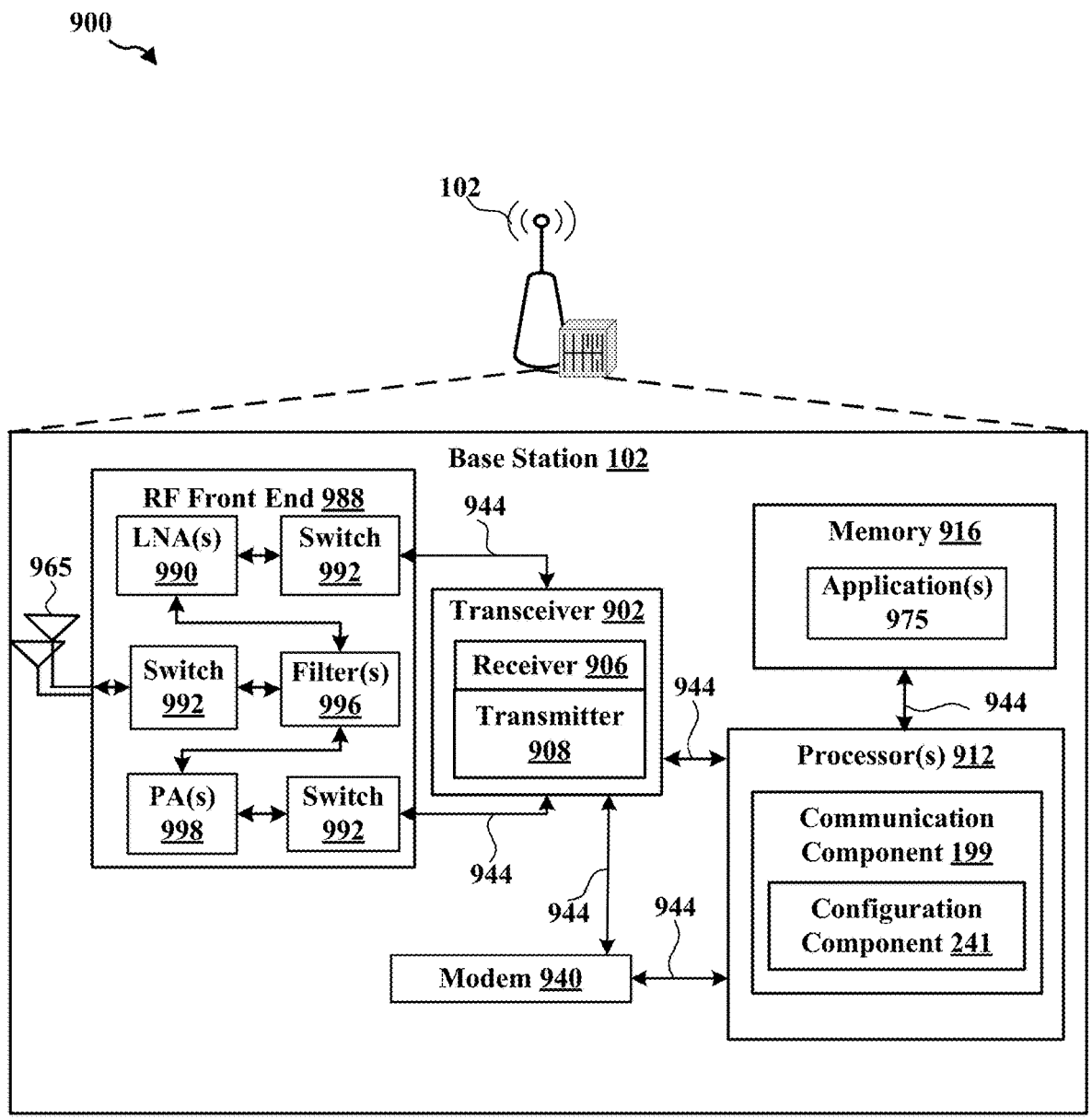
FIG. 9 is a block diagram illustrating an example of a base station, in accordance with various aspects of the present disclosure.

Referring to FIG. 9, one example of an implementation of base station 102 (e.g., a base station 102, as described above) may include a variety of components, some of which have already been described above, but including components such as one or more processors 912 and memory 916 and transceiver 902 in communication via one or more buses 944, which may operate in conjunction with modem 940 and communication component 199 for communicating reference signals.

The transceiver 902, receiver 906, transmitter 908, one or more processors 912, memory 916, applications 975, buses 944, RF front end 988, LNAs 990, switches 992, filters 996, PAs 998, and one or more antennas 965 may be the same as or similar to the corresponding components of UE 104, as described above, but configured or otherwise programmed for base station operations as opposed to UE operations.

In an aspect, the processor(s) 912 may correspond to one or more of the processors described in connection with the base station in FIG. 3. Similarly, the memory 916 may correspond to the memory described in connection with the base station in FIG. 3.

SOME FURTHER EXAMPLE CLAUSES

Implementation examples are described in the following numbered clauses:

1. A method of wireless communication at a user equipment (UE), comprising:
   measuring one or more synchronization signal block (SSB) beams from a network entity;
   selecting a highest rated SSB beam from the one or more SSB beams based on one or more selection factors;
   transmitting a beam report including an identification of the highest rated SSB beam to the network entity;
   initiating a timer in response to transmitting the beam report;
   determining whether a media access control (MAC) control element (CE) is received from the network entity before expiration of the timer; and
   performing beam switching from a current SSB beam to the highest rated SSB beam based on a determination that the MAC CE is not received from the network entity before expiration of the timer.
2. The method of clause 1, wherein the one or more selection factors includes a physical broadcast channel (PBCH) cyclic redundancy check (CRC) threshold.
3. The method of any preceding clause, wherein selecting the highest rated SSB beam further comprises selecting the highest rated SSB beam from the one or more SSB beams with a corresponding PBCH CRC that satisfies the PBCH CRC threshold.
4. The method of any preceding clause, wherein performing the beam switching from the current SSB beam to the highest rated SSB beam is further based on a determination that no beam failure detection or beam failure recovery process has initiated before expiration of a second timer.
5. The method of any preceding clause, wherein determining whether the MAC CE is received from the network entity before expiration of the timer further comprises determining whether the MAC CE is received on a physical downlink shared channel (PDSCH) or physical downlink control channel (PDCCH) from the network entity before expiration of the timer.
6. The method of any preceding clause, wherein measuring the one or more SSB beams further comprises measuring a corresponding reference signal receive power (RSRP) for each of the one or more SSB beams.
7. The method of any preceding clause, wherein selecting the highest rated SSB beam from the one or more SSB beams further comprises ranking the corresponding RSRP for each of the one or more SSB beams, wherein the a RSRP of one of the one or more SSB beams with a highest average power corresponds to the highest rated SSB beam.
8. The method of any preceding clause, wherein measuring the one or more SSB beams further comprises measuring one or more neighbor SSB transmission beams paired with one or more reception beams at a current position of the UE.
9. The method of any preceding clause, wherein the one or more neighbor SSB transmission beams correspond to virtual serving SSB (VSSSB) beams.
10. A method of wireless communication at a user equipment (UE), comprising:
    measuring one or more synchronization signal block (SSB) beams from a network entity;
    selecting a highest rated SSB beam from the one or more SSB beams based on one or more selection factors;
    initiating a timer in response to the selecting of the highest rated SSB beam;
    determining whether a media access control (MAC) control element (CE) is received from the network entity before expiration of the timer;
    transmitting a request for a radio resource control (RRC) reconfiguration message including the identification of the highest rated SSB beam to the network entity based on a determination that the MAC CE is not received from the network entity before expiration of the timer;
    receiving the RRC reconfiguration message from the network entity in response to transmitting the request; and
    performing beam switching from a current SSB beam to the highest rated SSB beam based on the RRC reconfiguration message.
11. The method of clause 10, wherein the one or more selection factors includes a physical broadcast channel (PBCH) cyclic redundancy check (CRC) threshold.
12. The method of any preceding clause, wherein selecting the highest rated SSB beam further comprises selecting the highest rated SSB beam from the one or more SSB beams with a corresponding PBCH CRC that satisfies the PBCH CRC threshold.
13. The method of any preceding clause, wherein the request corresponds a measurement reporting message with an additional field including information associated with the request.

14. The method of any preceding clause, wherein the request is associated with a handshaking procedure between the UE and the network entity.
15. The method of any preceding clause, wherein measuring the one or more SSB beams further comprises measuring a corresponding reference signal receive power (RSRP) for each of the one or more SSB beams.
16. The method of any preceding clause, wherein selecting the highest rated SSB beam from the one or more SSB beams further comprises ranking the corresponding RSRP for each of the one or more SSB beams, wherein the a RSRP of one of the one or more SSB beams with a highest average power corresponds to the highest rated SSB beam.
17. The method of any preceding clause, wherein measuring the one or more SSB beams further comprises measuring one or more neighbor SSB transmission beams paired with one or more reception beams at a current position of the UE.
18. The method of any preceding clause, wherein the one or more neighbor SSB transmission beams correspond to virtual serving SSB (VSSSB) beams.
19. An apparatus for wireless communication at a user equipment (UE), comprising:
a transceiver;
a memory configured to store instructions; and
one or more processors communicatively coupled with the transceiver and the memory, wherein the one or more processors are configured to execute the instructions to:
measure one or more synchronization signal block (SSB) beams from a network entity;
select a highest rated SSB beam from the one or more SSB beams based on one or more selection factors;
transmit a beam report including an identification of the highest rated SSB beam to the network entity;
initiate a timer in response to transmitting the beam report;
determine whether a media access control (MAC) control element (CE) is received from the network entity before expiration of the timer; and
perform beam switching from a current SSB beam to the highest rated SSB beam based on a determination that the MAC CE is not received from the network entity before expiration of the timer.
20. The apparatus of clause 19, wherein the one or more selection factors includes a physical broadcast channel (PBCH) cyclic redundancy check (CRC) threshold.
21. The apparatus of any preceding clause, wherein selecting the highest rated SSB beam further comprises selecting the highest rated SSB beam from the one or more SSB beams with a corresponding PBCH CRC that satisfies the PBCH CRC threshold.
22. The apparatus of any preceding clause, wherein performing the beam switching from the current SSB beam to the highest rated SSB beam is further based on a determination that no beam failure detection or beam failure recovery process has initiated before expiration of a second timer.
23. The apparatus of any preceding clause, wherein determining whether the MAC CE is received from the network entity before expiration of the timer further comprises determining whether the MAC CE is received on a physical downlink shared channel (PDSCH) or physical downlink control channel (PDCCH) from the network entity before expiration of the timer.
24. The apparatus of any preceding clause, wherein measuring the one or more SSB beams further comprises measuring a corresponding reference signal receive power (RSRP) for each of the one or more SSB beams.
25. An apparatus for wireless communication at a user equipment (UE), comprising:
a transceiver;
a memory configured to store instructions; and
one or more processors communicatively coupled with the transceiver and the memory, wherein the one or more processors are configured to execute the instructions to:
measure one or more synchronization signal block (SSB) beams from a network entity;
select a highest rated SSB beam from the one or more SSB beams based on one or more selection factors;
initiating a timer in response to the selecting of the highest rated SSB beam;
determine whether a media access control (MAC) control element (CE) is received from the network entity before expiration of the timer;
transmit a request for a radio resource control (RRC) reconfiguration message including the identification of the highest rated SSB beam to the network entity based on a determination that the MAC CE is not received from the network entity before expiration of the timer;
receive the RRC reconfiguration message from the network entity in response to transmitting the request; and
perform beam switching from a current SSB beam to the highest rated SSB beam based on the RRC reconfiguration message.
26. The apparatus of clause 25, wherein the one or more selection factors includes a physical broadcast channel (PBCH) cyclic redundancy check (CRC) threshold.
27. The apparatus of any preceding clause, wherein selecting the highest rated SSB beam further comprises selecting the highest rated SSB beam from the one or more SSB beams with a corresponding PBCH CRC that satisfies the PBCH CRC threshold.
28. The apparatus of any preceding clause, wherein the request corresponds a measurement reporting message with an additional field including information associated with the request.
29. The apparatus of any preceding clause, wherein the request is associated with a handshaking procedure between the UE and the network entity.
30. The apparatus of any preceding clause, wherein measuring the one or more SSB beams further comprises measuring a corresponding reference signal receive power (RSRP) for each of the one or more SSB beams.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   measuring one or more synchronization signal block (SSB) beams from a network entity;
   selecting a highest rated SSB beam from the one or more SSB beams based on one or more selection factors;
   transmitting a beam report including an identification of the highest rated SSB beam to the network entity;
   initiating a timer in response to transmitting the beam report;
   determining whether a media access control (MAC) control element (CE) is received from the network entity before expiration of the timer; and
   performing beam switching from a current SSB beam to the highest rated SSB beam based on a determination that the MAC CE is not received from the network entity before expiration of the timer.

2. The method of claim 1, wherein the one or more selection factors includes a physical broadcast channel (PBCH) cyclic redundancy check (CRC) threshold.

3. The method of claim 2, wherein selecting the highest rated SSB beam further comprises selecting the highest rated SSB beam from the one or more SSB beams with a corresponding PBCH CRC that satisfies the PBCH CRC threshold.

4. The method of claim 1, wherein performing the beam switching from the current SSB beam to the highest rated SSB beam is further based on a determination that no beam failure detection or beam failure recovery process has initiated before expiration of a second timer.

5. The method of claim 1, wherein determining whether the MAC CE is received from the network entity before expiration of the timer further comprises determining whether the MAC CE is received on a physical downlink shared channel (PDSCH) or physical downlink control channel (PDCCH) from the network entity before expiration of the timer.

6. The method of claim 1, wherein measuring the one or more SSB beams further comprises measuring a corresponding reference signal receive power (RSRP) for each of the one or more SSB beams.

7. The method of claim 1, wherein selecting the highest rated SSB beam from the one or more SSB beams further comprises ranking the corresponding RSRP for each of the one or more SSB beams, wherein the a RSRP of one of the one or more SSB beams with a highest average power corresponds to the highest rated SSB beam.

8. The method of claim 1, wherein measuring the one or more SSB beams further comprises measuring one or more neighbor SSB transmission beams paired with one or more reception beams at a current position of the UE.

9. The method of claim 8, wherein the one or more neighbor SSB transmission beams correspond to virtual serving SSB (VSSSB) beams.

10. A method of wireless communication at a user equipment (UE), comprising:
    measuring one or more synchronization signal block (SSB) beams from a network entity;
    selecting a highest rated SSB beam from the one or more SSB beams based on one or more selection factors;
    initiating a timer in response to the selecting of the highest rated SSB beam;
    determining whether a media access control (MAC) control element (CE) is received from the network entity before expiration of the timer;
    transmitting a request for a radio resource control (RRC) reconfiguration message including the identification of the highest rated SSB beam to the network entity based on a determination that the MAC CE is not received from the network entity before expiration of the timer;
    receiving the RRC reconfiguration message from the network entity in response to transmitting the request; and
    performing beam switching from a current SSB beam to the highest rated SSB beam based on the RRC reconfiguration message.

11. The method of claim 10, wherein the one or more selection factors includes a physical broadcast channel (PBCH) cyclic redundancy check (CRC) threshold.

12. The method of claim 11, wherein selecting the highest rated SSB beam further comprises selecting the highest rated SSB beam from the one or more SSB beams with a corresponding PBCH CRC that satisfies the PBCH CRC threshold.

13. The method of claim 10, wherein the request corresponds a measurement reporting message with an additional field including information associated with the request.

14. The method of claim 10, wherein the request is associated with a handshaking procedure between the UE and the network entity.

15. The method of claim 10, wherein measuring the one or more SSB beams further comprises measuring a corresponding reference signal receive power (RSRP) for each of the one or more SSB beams.

16. The method of claim 10, wherein selecting the highest rated SSB beam from the one or more SSB beams further comprises ranking the corresponding RSRP for each of the one or more SSB beams, wherein the a RSRP of one of the one or more SSB beams with a highest average power corresponds to the highest rated SSB beam.

17. The method of claim 10, wherein measuring the one or more SSB beams further comprises measuring one or more neighbor SSB transmission beams paired with one or more reception beams at a current position of the UE.

18. The method of claim 17, wherein the one or more neighbor SSB transmission beams correspond to virtual serving SSB (VSSSB) beams.

19. An apparatus for wireless communication at a user equipment (UE), comprising:
 a transceiver;
 a memory configured to store instructions; and
 one or more processors communicatively coupled with the transceiver and the memory, wherein the one or more processors are configured to execute the instructions to:
  measure one or more synchronization signal block (SSB) beams from a network entity;
  select a highest rated SSB beam from the one or more SSB beams based on one or more selection factors;
  transmit a beam report including an identification of the highest rated SSB beam to the network entity;
  initiate a timer in response to transmitting the beam report;
  determine whether a media access control (MAC) control element (CE) is received from the network entity before expiration of the timer; and
  perform beam switching from a current SSB beam to the highest rated SSB beam based on a determination that the MAC CE is not received from the network entity before expiration of the timer.

20. The apparatus of claim 19, wherein the one or more selection factors includes a physical broadcast channel (PBCH) cyclic redundancy check (CRC) threshold.

21. The apparatus of claim 20, wherein selecting the highest rated SSB beam further comprises selecting the highest rated SSB beam from the one or more SSB beams with a corresponding PBCH CRC that satisfies the PBCH CRC threshold.

22. The apparatus of claim 19, wherein performing the beam switching from the current SSB beam to the highest rated SSB beam is further based on a determination that no beam failure detection or beam failure recovery process has initiated before expiration of a second timer.

23. The apparatus of claim 19, wherein determining whether the MAC CE is received from the network entity before expiration of the timer further comprises determining whether the MAC CE is received on a physical downlink shared channel (PDSCH) or physical downlink control channel (PDCCH) from the network entity before expiration of the timer.

24. The apparatus of claim 19, wherein measuring the one or more SSB beams further comprises measuring a corresponding reference signal receive power (RSRP) for each of the one or more SSB beams.

25. An apparatus for wireless communication at a user equipment (UE), comprising:
 a transceiver;
 a memory configured to store instructions; and
 one or more processors communicatively coupled with the transceiver and the memory, wherein the one or more processors are configured to execute the instructions to:
  measure one or more synchronization signal block (SSB) beams from a network entity;
  select a highest rated SSB beam from the one or more SSB beams based on one or more selection factors;
  initiating a timer in response to the selecting of the highest rated SSB beam;
  determine whether a media access control (MAC) control element (CE) is received from the network entity before expiration of the timer;
  transmit a request for a radio resource control (RRC) reconfiguration message including the identification of the highest rated SSB beam to the network entity based on a determination that the MAC CE is not received from the network entity before expiration of the timer;
  receive the RRC reconfiguration message from the network entity in response to transmitting the request; and
  perform beam switching from a current SSB beam to the highest rated SSB beam based on the RRC reconfiguration message.

26. The apparatus of claim 25, wherein the one or more selection factors includes a physical broadcast channel (PBCH) cyclic redundancy check (CRC) threshold.

27. The apparatus of claim 26, wherein selecting the highest rated SSB beam further comprises selecting the highest rated SSB beam from the one or more SSB beams with a corresponding PBCH CRC that satisfies the PBCH CRC threshold.

28. The apparatus of claim 25, wherein the request corresponds a measurement reporting message with an additional field including information associated with the request.

29. The apparatus of claim 25, wherein the request is associated with a handshaking procedure between the UE and the network entity.

30. The apparatus of claim 25, wherein measuring the one or more SSB beams further comprises measuring a corresponding reference signal receive power (RSRP) for each of the one or more SSB beams.

* * * * *